(12) United States Patent
Marshall

(10) Patent No.: US 8,473,394 B2
(45) Date of Patent: Jun. 25, 2013

(54) SYSTEM, METHOD, AND COMPUTER PROGRAM PRODUCT FOR ISSUING AUTOMATIC PAYMENTS LINKED TRANSACTION ACCOUNT

(75) Inventor: Vernon Marshall, Monclair, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 236 days.

(21) Appl. No.: 12/951,640

(22) Filed: Nov. 22, 2010

(65) Prior Publication Data
US 2012/0130786 A1      May 24, 2012

(51) Int. Cl.
*G06Q 40/00*     (2006.01)
*G06Q 30/00*     (2006.01)

(52) U.S. Cl.
USPC .............................. 705/35; 705/14.17; 705/38

(58) Field of Classification Search
USPC .......................................... 705/35, 38, 14.17
See application file for complete search history.

(56) References Cited

FOREIGN PATENT DOCUMENTS
WO    WO2009018377    *    5/2009

* cited by examiner

*Primary Examiner* — Daniel Felten
(74) *Attorney, Agent, or Firm* — Snell & Wilmer L.L.P.

(57) ABSTRACT

An enrolling system verifies an enrollee, counter-offers a second transaction account in response to a decline of a first account, wherein the second transaction account includes more restrictions than a first transaction account, associates an enrollee's main and overdraft account, and issues a transaction account. Enrolling in the second transaction account may include enrolling in a second transaction account automatic payment program; and/or associating a demand deposit account to the second transaction account. The method may also include relaxing use restrictions of the transaction account based upon at least one of: receiving payment of a pre-selected amount, receiving payments over a pre-selected period, and receiving payment on or before a pre-selected date.

19 Claims, 6 Drawing Sheets

US 8,473,394 B2

SYSTEM, METHOD, AND COMPUTER PROGRAM PRODUCT FOR ISSUING AUTOMATIC PAYMENTS LINKED TRANSACTION ACCOUNT

BACKGROUND

1. Field of the Invention

The present invention generally relates to transaction accounts.

2. Related Art

In the current market, many people have poor credit due to various reasons. Poor credit is generally associated with a low credit score. Low credit scores and associated poor credit may have many adverse results. For instance, borrowing terms are generally unavailable or less favorable to those with poor credit. Also, poor credit may be a negative factor during the hiring process as employers are increasingly performing detailed background checks, and often including a credit check.

Poor credit may be the result of a variety of factors, such as inability to pay bills, medical issues, a hardship, poor planning, foreclosure, divorce, lack of a borrowing history, high debt levels, multiple credit applications and fraudulent activities. Occasionally, an individual may desire to increase her credit score, but the mechanisms to do so may be out of reach. For instance, one way to raise a credit score is by having a long history of prompt bill payment. Another way to raise a credit score may be to increase one's available credit and lower the percentage of available credit used. However, the only credit option available for some individuals with very poor credit is a secured credit card, which requires that the available credit limit be secured by a demand deposit account.

Those seeking credit during a transaction account enrollment process are typically either approved or denied, with no third option with a given issuer. Given the foregoing, what is needed is a system, method and computer program product for offering another transaction account to those that would otherwise be denied.

SUMMARY

The present invention meets the various needs by providing a system, method and computer program product for establishing a second transaction account. The second transaction account may be offered to those denied a first transaction account, in response to a first transaction account enrollment request. In an exemplary embodiment, the system provides a counter-offer of a second transaction account to those denied a first transaction account. The second transaction account may also facilitate increasing an individual's credit score.

An exemplary method includes receiving a request for a first transaction account; determining the request for a first transaction account meets decline criteria (or fails to meet approval criteria); and counter-offering the request for the first transaction account with an offer for a second transaction account. Enrollment in the second transaction account may be conditioned upon the individual: (1) consenting to account automatic payment; and (2) associating a demand deposit account to the second transaction account. In one embodiment, a potential customer may be targeted, based upon pre-selected criteria, to be offered a second transaction account, without the customer applying for a first transaction account.

The method may also include relaxing use restrictions of the transaction account based upon at least one of: receiving payment of a pre-selected amount, receiving payments over a pre-selected period, and receiving payment on or before a pre-selected date. The method may also facilitate building one of the transaction account holder's credit score or a transaction account holder's credit worthiness based on at least one of: receiving payment of a pre-selected amount, receiving payments over a pre-selected period, and receiving payment on or before a pre-selected date.

BRIEF DESCRIPTION OF THE DRAWINGS

The features and advantages of the present invention will become more apparent from the detailed description set forth below when taken in conjunction with the drawings. The left-most digit of a reference number identifies the drawing in which the reference number first appears.

DETAILED DESCRIPTION

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In one exemplary embodiment, a system, method and/or computer program product for enrolling in and/or issuing a second transaction account in response to a request for a first account is disclosed. Specifically, in one exemplary embodiment, the system establishes a second transaction account with restrictions, in response to a request for a first account, wherein the first account has fewer restrictions than the proposed second transaction account.

Referring now to FIGS. 1-11, the process flows and screenshots depicted are merely embodiments and are not intended to limit the scope of the invention as described herein. For example, the steps recited in any of the method or process descriptions may be executed in any order and are not limited to the order presented.

Figure 1:
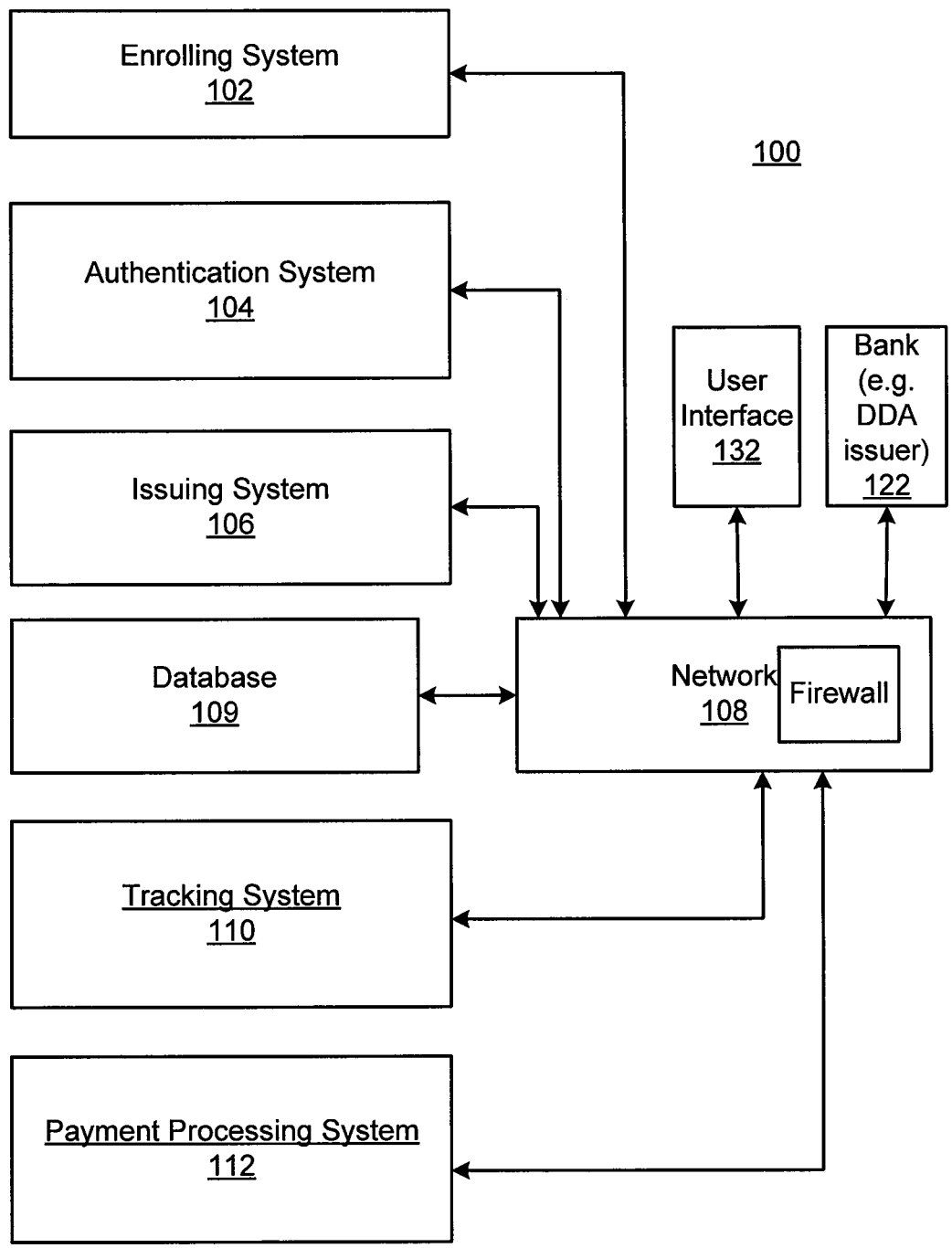
FIG. 1 shows an exemplary system diagram.

FIG. 1 shows an exemplary system 100 that includes an enrolling system 102, an authentication system 104, an issuing system 106, database 109, a tracking system 110 and a payment processing system 112, all or some of which can be coupled via a network 108. Customers wanting to establish a first transaction account with an issuer enter information or data into enrolling system 102. This information can be, for example, personal, financial, biographical, biometrical, or other relevant information. The information is transmitted via network 108 (or directly in some examples) to authentication system 104. Authentication system 104 can be operated and positioned as an issuing company's system or can be a third party system, in various examples. The authentication system 104 may perform a fraud check, an identify verification, and/or a credit worthiness check. In addition, authentication system 104 may obtain information from third party sources (including, but not limited to, credit bureaus) regarding the applicant for consideration. In one exemplary embodiment, in response to the results of the authentication system 104 authentication process (e.g., based on preset threshold of risk and preprogrammed logic) a customer may be offered (e.g., by issuing system 106) a first transaction account, a customer may be offered (e.g., by issuing system 106) a second transaction account having more restrictions than the first transaction account, a customer may be prompted to verify and/or re-enter customer information, such as DDA information, and/or a customer may be rejected (e.g., by issuing system 106). A customer may accept an offer or the customer may reject an offer. A rejected customer's contact information may be stored, so that duplicate applications are not processed within a set period of time, the rejected customer is not contacted with inappropriate financial products and/or is not contacted in the future regarding any financial products.

In one exemplary embodiment, upon a finding by the authentication system 104 that a customer fails to meet the criteria to be issued a first transaction account, the authentication system 104 and/or issuing system 106 determines if the customer meets the criteria to be issued a second transaction account. In one exemplary embodiment, one or more factors are used to determine if a customer meets the criteria to be issued a first transaction account or a second transaction account. The factors may include, for example credit history, credit score, contemporaneous transaction account activity (issued by the same issuer or third party issuers), previous transaction account duration, providing valid demand deposit account information, employment status, employment history, age, financial history and/or other factors.

The restrictions on the second transaction account may be one or more of a requirement to link a demand deposit account to the transaction account, a predetermined spending limit, a requirement to have overdraft protection on the demand deposit account, and/or transaction account usage restrictions. These restrictions may be reduced, increased and/or removed at any suitable time either individually, or as a group. In one exemplary embodiment, the restrictions are reduced due to activities of the transaction account holder. For instance, the activities of the transaction account holder may include one or more of payment of the second transaction account balance over a predetermined duration and/or a positive change in one or more of credit history, contemporaneous transaction account activity, previous transaction account duration, employment status, employment history, age, financial history and/or other activities. For instance, a predetermined spending limit may initially be set to any amount, such as being set to $500.00. Upon timely payment (such as before or on the day the balance is due) of the second transaction account over a predetermined threshold (such as payment of the monthly balance in full) and over a predetermined period (such as a period of 12 months), then a predetermined spending limit may be adjusted (such as increased to $1,500.00).

On the date that a balance for the second transaction account is due, (unless the fund is paid over a pre-selected threshold in advance) fund availability in a DDA tied to the second transaction account may be verified, for example using tracking system 110. A demand deposit account (DDA), as used herein, is an account generally held at a bank 122 or other financial institution, for the purpose of securely and quickly providing frequent access to funds on demand, through a variety of different channels. Because funds are available on demand these accounts are also referred to as demand accounts or demand deposit accounts. A demand deposit account is generally an account where funds deposited and held for later use. A demand deposit account is usually associated with one or more of a debit card, checking account, savings account, asset managed investment accounts and/or retirement accounts.

In one example, this may be accomplished using data extracted from online banking services of the customer's DDA bank 122. The customer provides consent and an appropriate user name/password for allowing the card issuer to sign into the online banking services of the DDA bank 122 for the purposes of obtaining available balance information. If the available DDA balance exceeds the amount of the second transaction account monthly balance, a preset balance payment amount may be automatically performed by a payment system, such as payment processing system 112 linked and/or coupled to the authentication system 104 and the issuing system 106. The payment processing system 112 may also be coupled to a tracking system 110. The preset balance payment amount is deducted from the DDA available balance. The card issuer may contract with third party service providers to provide account aggregation services that can facilitate the extraction of customer data from non-card issuer bank accounts.

In the event that the amount of the preset balance payment exceeds the DDA balance, an overdraw feature may optionally be used. These overdrafts may be monitored and/or facilitated by tracking system 110. The amount of the preset balance payment that exceeds the DDA balance may be assessed against a customer's existing transaction account that has been designated for use as an overdraft account. Alternatively, the amount of the preset balance payment that exceeds the DDA balance may accrue interest under the terms of the agreement of the customer's second transaction account with the card issuer. Additionally, the card issuer may ensure (e.g., on a periodic or per transaction basis) that the customer's linked DDA is in good standing. This may be accomplished through the use of external vendors to validate account standing. Optionally, a customer may link more than one DDA to the second transaction account.

A customer may also provide a payment and/or a partial payment of the second transaction account monthly balance through any additional funding mechanisms. These payments may be monitored and/or facilitated by tracking system 110 or payment system, respectively. For instance, a second DDA may be used to fund a portion of the second transaction account monthly balance prior to or on the due date, and/or a pre-selected amount of the remainder may be funded through the linked DDA. In one exemplary embodiment, in the case where the second transaction account comprises a charge card, the pre-selected amount may be payment of the full remainder. In another exemplary embodiment, in the case where the second transaction account comprises a credit card, the pre-selected amount may be payment of less than the full remainder. Generally, the sum of this payment of less than the full remainder plus any additional payments is more than the issuer set minimum balance payment threshold.

The terms "member," "card member," "user," "end user", "consumer", "customer," "participant," etc., and/or the plural form of these terms are used interchangeably throughout herein to refer to those persons or entities capable of accessing, using, being affected by and/or benefiting from the tool disclosed herein.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

A financial institution (or similar entities used herein) may include any bank or entity typically operating under regulations of a card issuing association or other entity. The financial institution may also include any entity which issues cards to customers and/or cardmembers under a cardmember agreement for a cardmember account, such as a transaction account.

A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

"Open cards" are financial transaction cards that may be associated with the financial accounts discussed herein, and that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments up to ten dollars.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account", "account code", or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a transponder and RFID reader in RF communication with the transponder (which may include a fob). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account code may be distributed and stored in any form of plastic, electronic, magnetic, radio frequency, wireless, audio and/or optical device capable of transmitting or downloading data from itself to a second device. A customer account code may be, for example, a sixteen-digit transaction account code, although each transaction account provider has its own numbering system, such as the fifteen-digit numbering system used by American Express. Each company's transaction account codes comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account code may be, for example, any number or alpha-numeric characters that identify a particular merchant for purposes of card acceptance, account reconciliation, reporting, or the like.

It should be noted that the transfer of information in accordance with the present invention, may be completed in a format recognizable by a merchant system or account issuer. In that regard, by way of example, the information may be transmitted from an RFID device to an RFID reader or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portions of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e., name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with the present invention, it may be provided in magnetic stripe track format. For example, the counter values, authentication tags and encrypted identifiers, described herein, may be forwarded encoded in all or a portion of a data stream representing data encoded in, for example, track 2 or track 3 format.

Figure 2:
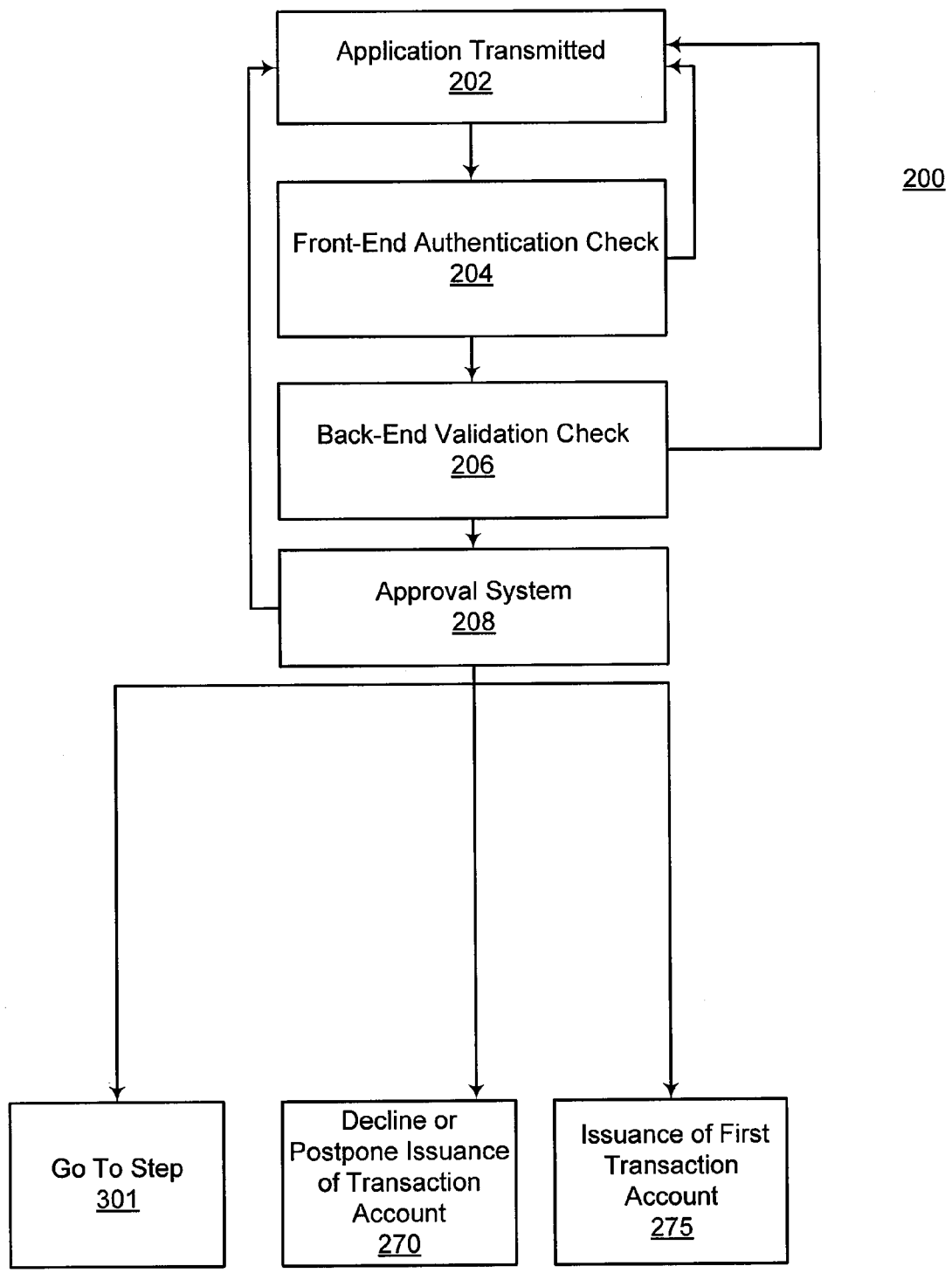
FIG. 2 shows a flowchart depicting an exemplary transaction account enrollment method.

FIG. 2 shows a flowchart depicting an exemplary debit card application method 200. In step 202, an application for a first transaction account is transmitted, such as to a transaction account issuing company though any suitable method, such as through an interface to enrolling system 102 of FIG. 1. In step 204, a front-end authentication system performs an authentication check of submitted information. In response to the front-end authentication system indicating a "failed authentication", a user may be prompted to verify and re-enter information. In one embodiment, a front-end authentication system may provide (i.e. auto-fill) stored information for verification by a customer. Front-end authentication system performs another authentication check of submitted information (step 204). In response to validly clearing the front-end authentication check of step 204, in step 206 a back-end processor performs a validation check and an approval inquiry based on customer information. Front-end authentication system and back-end processor may be a part of authentication system 104 from FIG. 1. This customer information may be stored on an internal database, stored on a third party network, and/or provided by the customer, such as in the application. The validation check and approval inquiry may be performed by the same processor or by separate processing systems. In step 208, an approval system, such as issuing system 106 makes a determination based upon stored logic and customer information whether to approve a first transaction account issuance to the customer 275, whether to issue a request for additional information to the customer, whether to advise a customer that a first transaction account was declined and counter offer a customer a second transaction account issuance, and/or whether to decline or postpone transaction account issuance 270.

Figure 3:
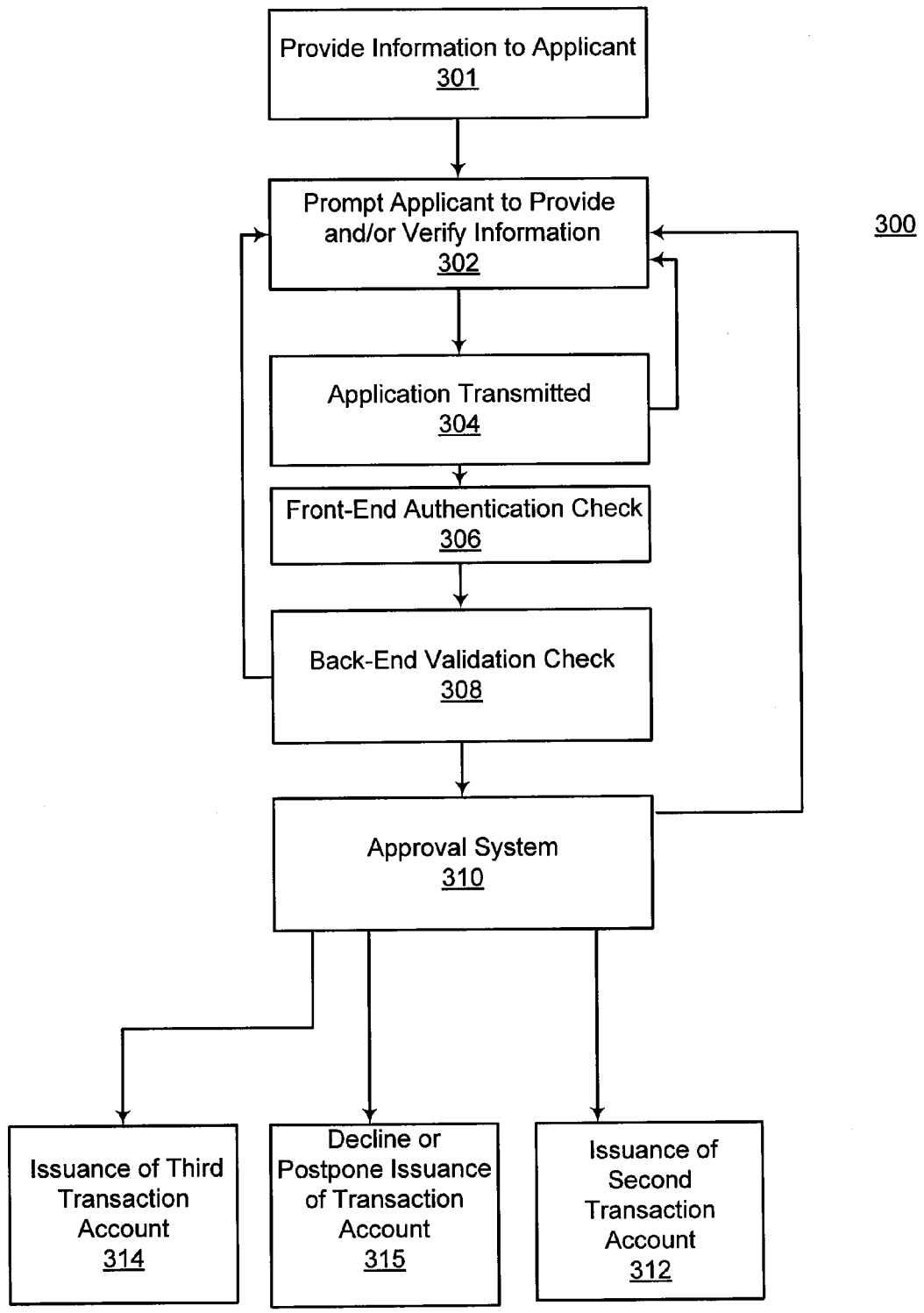
FIG. 3 shows a flowchart depicting an exemplary transaction account an enrollment method.

FIG. 3 shows a flowchart depicting an exemplary transaction account application method 300. It is conceived that some steps may be removed from method 300. For instance, those steps duplicated and/or rendered obsolete by customers whom have used process flow 200 (such as performing a credit check and providing duplicated application information may be omitted in method 300). In step 301, a customer is provided information about a second transaction account. In step 302, if a customer wishes to apply for a second transaction account, a customer is prompted to provide information required for issuance of a second transaction account. This providing of information may be performed over the web, telephone or through a paper application. In one exemplary embodiment, stored customer information may be autofilled into a web based application for a second transaction account by a processing system to reduce the amount of information to be provided and/or entered by the customer. This may result in fewer entering errors by the customer. For instance, the information for a second transaction account may be information related to the restrictions placed on a second transaction account.

In one exemplary embodiment, the information for a second transaction account may be DDA information, such as account type, routing and transaction account information. In one exemplary embodiment, the information for a second transaction account may be other DDA information, such as approval for automatic payment processes and/or DDA status access. The information for a second transaction account may be overdraft information, such as transaction account identification and approval for overdraft use. The information for a second transaction account may be agreement to the terms and conditions of a second transaction account.

In step 304, the information is transmitted to a transaction account issuing company. This information may include bank DDA information and/or application information. In step 306, a front-end authentication system performs an authentication check of submitted information. For instance, a front-end authentication system may validate the format, characters and length of submitted responses in real time. In response to validly clearing the front-end authentication check of step 306, in step 308 a back-end processor optionally performs a validation check and an approval inquiry based on customer information. This customer information may be stored on an internal database, stored on a third party network, and/or provided by the customer, such as in the application. The validation check and approval inquiry may be performed by the same processor or by separate processing systems. In step 310, an approval system makes a determination based upon stored logic and customer information whether to approve a second transaction account issuance to the customer, issue a request for additional information, whether to counter offer a third transaction account issuance 314, or whether to decline and/or postpone transaction account issuance 315. In step 312, a second transaction account is issued to the customer. In one exemplary embodiment, the third transaction account may have fewer or more restrictions than a second transaction account based upon customer information.

In response to the customer's identity being verified and financial information being accepted, one or more accounts (e.g., overdraft, DDA, etc.) are associated with a transaction account, such as second transaction account. In one exemplary embodiment, customers are issued a second transaction account for enabling purchases at all merchants that accept transaction account(s).

For instance, in response to the validation check of DDA information returning a result of "invalid," a request for the customer to verify and resubmit DDA information may be transmitted to the customer. In one embodiment, in step 308, the DDA information is validated through a third party vendor.

In another exemplary embodiment, in response to the validation check of DDA information returning a result of "fraud," an application may be submitted to a system for resolving potential fraud and transaction account issuance may be postponed pending the resolving of the "fraud" result according to protocols.

For instance, a customer may be contacted through a secondary means (e.g., email, telephone, instant message, text message, letter, and/or teleconference) and asked to verify his identity and his desire to apply for a transaction account. If there is no response to the attempt to contact the customer within a predetermined period and/or the "fraud" result is not resolved, a transaction account may not be issued. If there is a response and the identity of the customer can be validated and the customer desires to open a transaction account, such as a second transaction account, a transaction account may be issued (312) to the customer.

In one example, authorization (e.g., the back-end validation check performed in step 308) is performed using an enrollment-Fraud Assessment system and method, in which a neutral-network decision model predicts the likelihood of fraud. This determines Identity Information Validation, which means the applicant is who he says he is. This can be accomplished using Predictive Scoring using a logistic scoring model. The following exemplary information can be used for the authorization: Thomson MICR* ID, Unpaid NSF checks written to retailers, Account status of serious unpaid NSF accounts, Closed account references from Multiple sources, Private/Shared velocity of all consumers as MICR funding activity on the Internet, OICR validation of known financial services companies that use ACH, Name/MICR Association from Debit Bureau, and/or Convenience Check Analysis. MICR Code is a nine-digit number that helps in sorting checks, and also helps in uniquely identifying a branch of any given bank in any given city.

Figure 4:
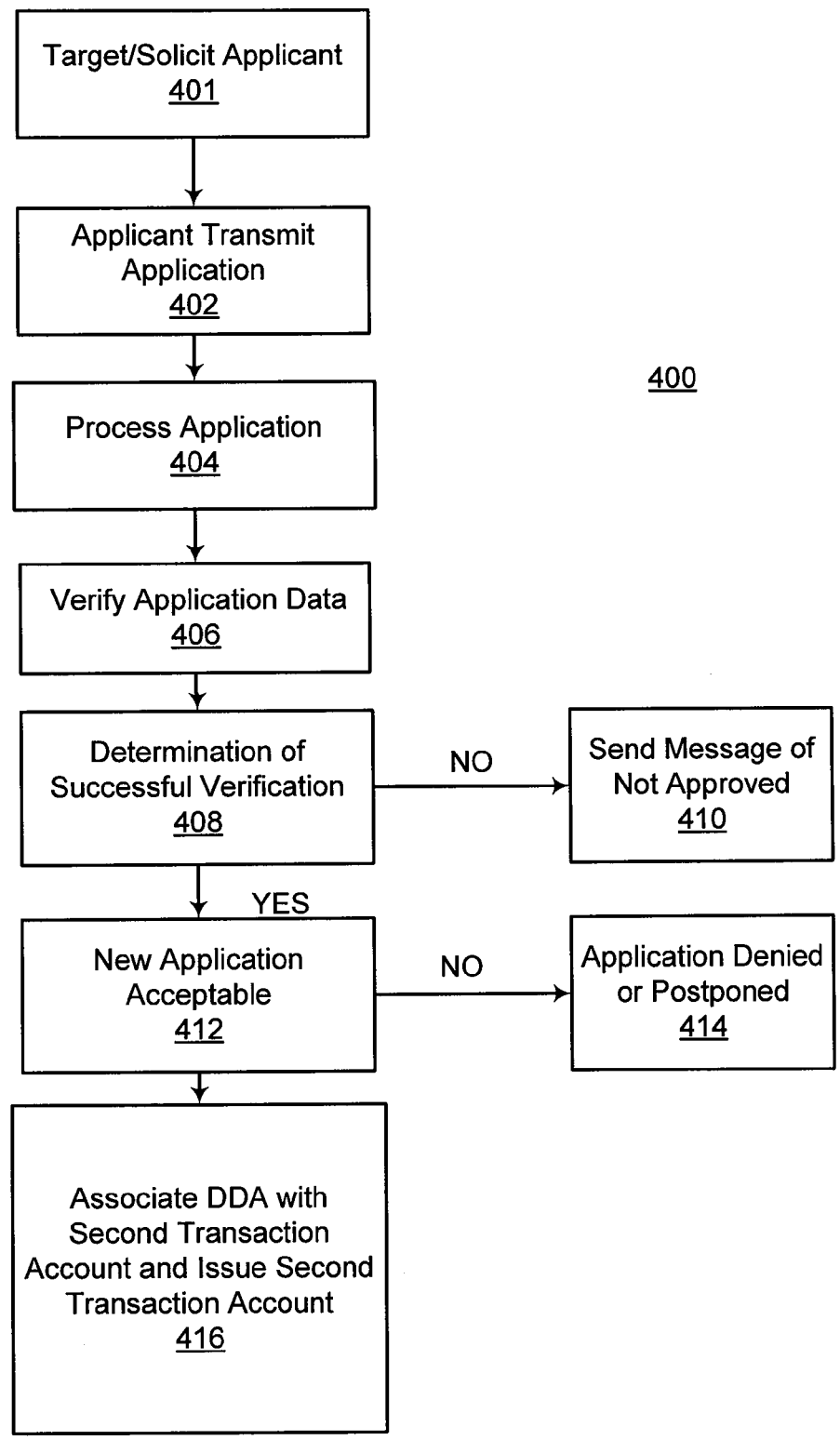
FIG. 4 shows a flowchart depicting an exemplary enrollment method.

FIG. 4 shows a flowchart depicting an exemplary enrollment method 400. In one exemplary embodiment, a customer is targeted for solicitation of a second transaction account 401 based upon predetermined factors. These factors may be those that contribute to having a poor credit score or those that result in higher credit risks for transaction account issuers. For instance, undergoing a hardship, foreclosure, divorce, a lack of a borrowing history, youth, having high debt levels, and/or multiple contemporaneous credit applications. In step 402, an application for enrolling in a transaction account is transmitted to an issuer, such as a card issuing company. In step 404, the transaction account application is processed, including DDA information. In step 406, the applicant's identity, bank, and other information submitted in the application are verified. In step 408, a determination is made whether the verification was successful. If no, in step 410 a message is sent that the application was not approved. If yes, in step 412, a determination is made whether the new application should be accepted. If no, in step 414, a message is sent to the applicant that the application has been declined or postponed. If yes, in step 416, the applicant's bank accounts are associated with the transaction account and a transaction account is made available for use by the customer. For instance, a financial instrument (e.g., a physical card associated with the transaction account) may be sent to the customer.

In one exemplary embodiment, an account automatic payment program may be associated with the second transaction account. The automatic payment program may be configured to pay all or a selectable portion of purchases completed using the second transaction account.

Figure 5:
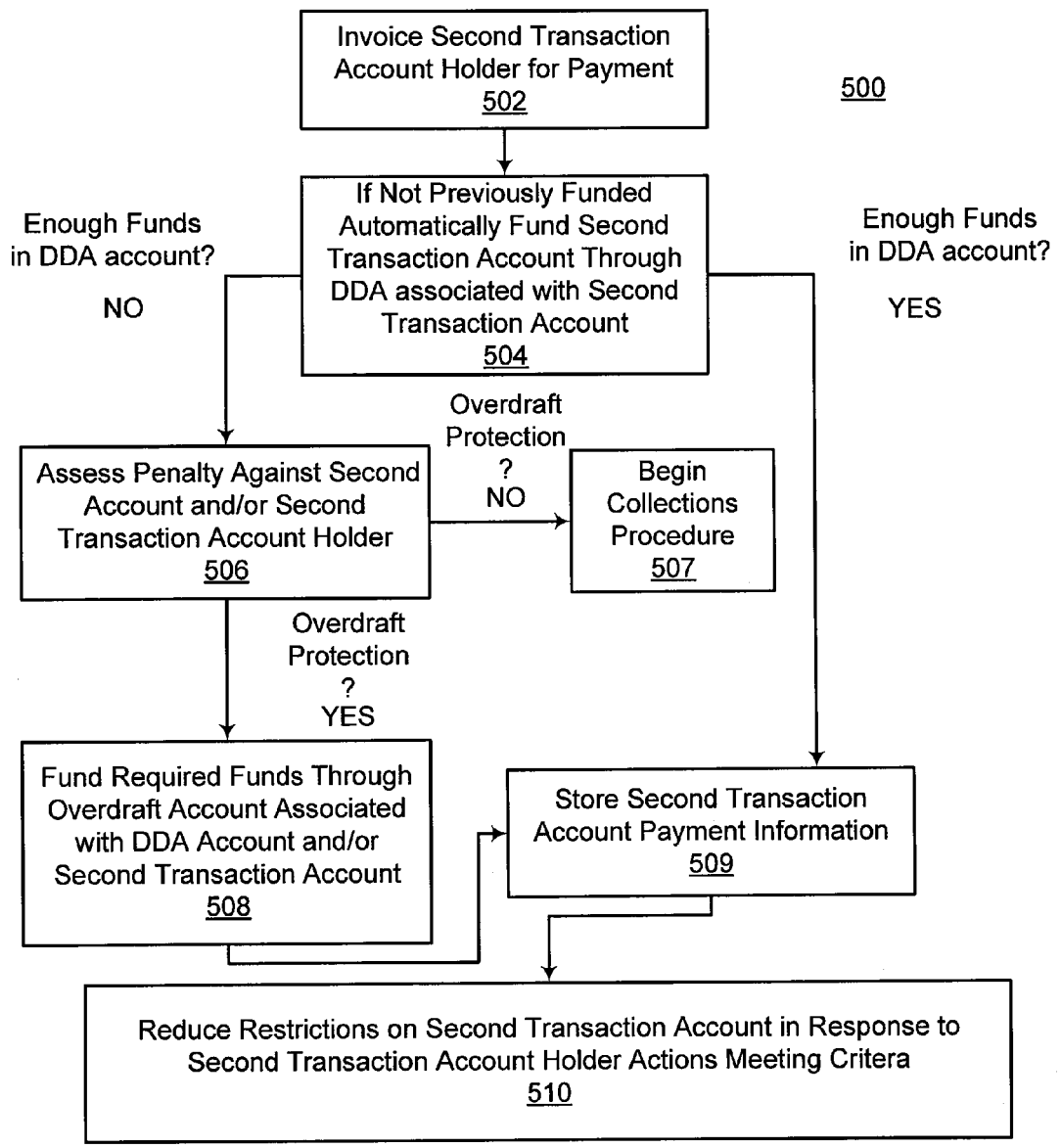
FIG. 5 shows a flowchart depicting an exemplary transaction account payment method.

FIG. 5 shows a flowchart depicting an exemplary removal of restrictions on a second transaction account method 500. The customer may be invoiced for payment of the second transaction account associated with the customer at a predetermined time (step 502). For instance, this predetermined time may be monthly.

In one exemplary embodiment, if the second transaction balance is not paid at or over a pre-selected amount prior to the due date, the second transaction account may be automatically paid (e.g., using a DDA associated with the second transaction account) a pre-selected amount (step 504). For instance, an account automatic payment program may be associated with the second transaction account. The automatic payment program may be configured to pay all or a selectable portion of purchases completed with the second transaction account. The automatic payment program may be associated with one or more DDA, and/or alternative transaction account.

The pre-selected amount automatically paid by the automatic payment program may be the minimum balance requested by the transaction account issuer. The pre-selected amount may be the balance payment in full. The pre-selected amount may be any suitable amount, but is generally greater than the minimum balance requested by the account issuer.

In one exemplary embodiment, in response to the second transaction balance not paid a pre-selected amount after the due date (e.g., the due to insufficient funds being stored in the DDA), a collections procedure may be initiated (507) and/or a penalty may be assessed against the second transaction account and/or the second transaction account holder (506). This penalty may be a financial penalty, and/or a blemish against the account holder to be stored for later determinations of second transaction account restriction removal. In one exemplary embodiment, in response to the second transaction balance not paid a pre-selected amount after the due date (e.g., due to insufficient funds being stored in the DDA), an overdraft account may be used to pay the second transaction balance to a pre-selected amount (step 508). In one exemplary embodiment, the overdraft account is associated with the DDA. The overdraft account may be associated with the second transaction account. In this embodiment, a penalty may be assessed against the second transaction account and/or the second transaction account holder. This penalty may be a financial penalty, and/or a blemish against the account holder to be stored for later determinations of second transaction account restriction removal.

In one exemplary embodiment, in response to payments of a pre-selected amount being received on or before the due date and stored (509), restrictions placed upon the second transaction account may be removed, relaxed and/or reduced (step 510). In one exemplary embodiment, in response to payments of a pre-selected amount being received on or before the due date, restrictions placed upon the second transaction account (e.g., periodically over a predetermined period) may be removed and/or reduced. In one exemplary embodiment, in response to payments being received on or before the due date, restrictions placed upon the second transaction account may be removed and/or reduced.

In one exemplary embodiment, relaxing restrictions includes at least one of increasing the spend limit threshold on the second transaction account; removal of the demand deposit account link to the second transaction account; and suspension of the requirement to link an automatic payment program to the second transaction account.

A customer may use the present system as a tool and/or method to improve their credit score. For instance, a customer's credit score may be improved based upon timely payments of the second transaction account to a predetermined level.

In one example, customers of the offered transaction account may accrue points towards a loyalty program for any of the steps or actions set forth herein, such as the American Express Membership Rewards, Delta SkyMiles, Hilton HHonors, Starwood Points, Discover Cashback Bonus, or the like. Points accrued via this product may be aggregated to an existing loyalty program account. In lieu of points, the issuer may offer cash back on purchases or any other incentive.

The restrictions on the second transaction account may be removed and/or reduced from the second transaction account such that a second transaction account may be indistinguishable from a first transaction account. The physical appearance of a financial instrument (such as a physical card) associated with a first transaction account may be indistinguishable from the physical appearance of financial instrument (such as a physical card) associated with a second transaction account. A transaction account issuer may audit the second transaction account at any suitable time (e.g., after 12 months of card issuance) to determine if restrictions should be adjusted or reduced. In one exemplary embodiment, an incentive (e.g., a financial incentive) may be provided to a customer for supplying data (e.g., DDA information) to a transaction account issuer. In this exemplary embodiment, an incentive may not be paid unless the customer maintains an active DDA account with sufficient funding to cover payments of a predetermined level for a predetermined period. For instance, the predetermined level may be at least one of at or over the second transaction account monthly minimum balance or the second transaction account monthly balance payment in full. For instance, the period may be 12 months. A second DDA may be linked to a second transaction account for automatic payment.

A first DDA account may be removed after a second DDA account has been linked to a second transaction account for automatic payment. In one exemplary embodiment, in response to removal of "auto-payment" over a specified period, second transaction account use privileges may be temporarily or permanently adjusted, reduced and/or removed. In one exemplary embodiment, in response to removal of all DDAs over a specified period, transaction account use privileges may be temporarily or permanently adjusted, reduced and/or removed. In one exemplary embodiment, in response payments of statement balances being sent to collections, transaction account use privileges may be temporarily or permanently reduced and/or removed. In one exemplary embodiment, in response insufficient funds in the demand deposit account to pay a pre-selected portion of the second transaction account balance, account use privileges may be temporarily or permanently adjusted, reduced and/or removed. In one exemplary embodiment, a transaction account holder may be given an option to retain certain restrictions (that would otherwise be available for removal) associated with a transaction account for a specified period in exchange for an incentive, such as a financial incentive.

In an exemplary embodiment, the system may include an interface on a display for communicating with a user, such as a customer, enrolling in a transaction account. In this embodiment, a user may be asked to accept the terms and conditions associated with the second transaction account and provide additional information. A display may depict an "autopay" enrollment (i.e. with an automatic payment) associated with a transaction account. In this embodiment, a user may select an automatic payment account type (e.g. from a drop down menu) submit and/or verify account and routing information with verification controls, such as entering both the account and routing information more than once. In this embodiment, a user may be asked to accept the terms and conditions associated with an automatic payment function associated with the second transaction account. If the user is not able to provide this information at this time, the session may be saved to be returned to later. If the user does not return to the saved session within a predetermined period, the user may be contacted through any suitable means with a follow-up solicitation for the missing information and/or approvals. In another exemplary embodiment, a display may depict a terms and conditions acceptance screen. In this embodiment, a user may confirm the accuracy of submitted information. In another exemplary embodiment, a display may depict an approval of a second transaction account, or a denial of a second transaction account.

Figure 6:
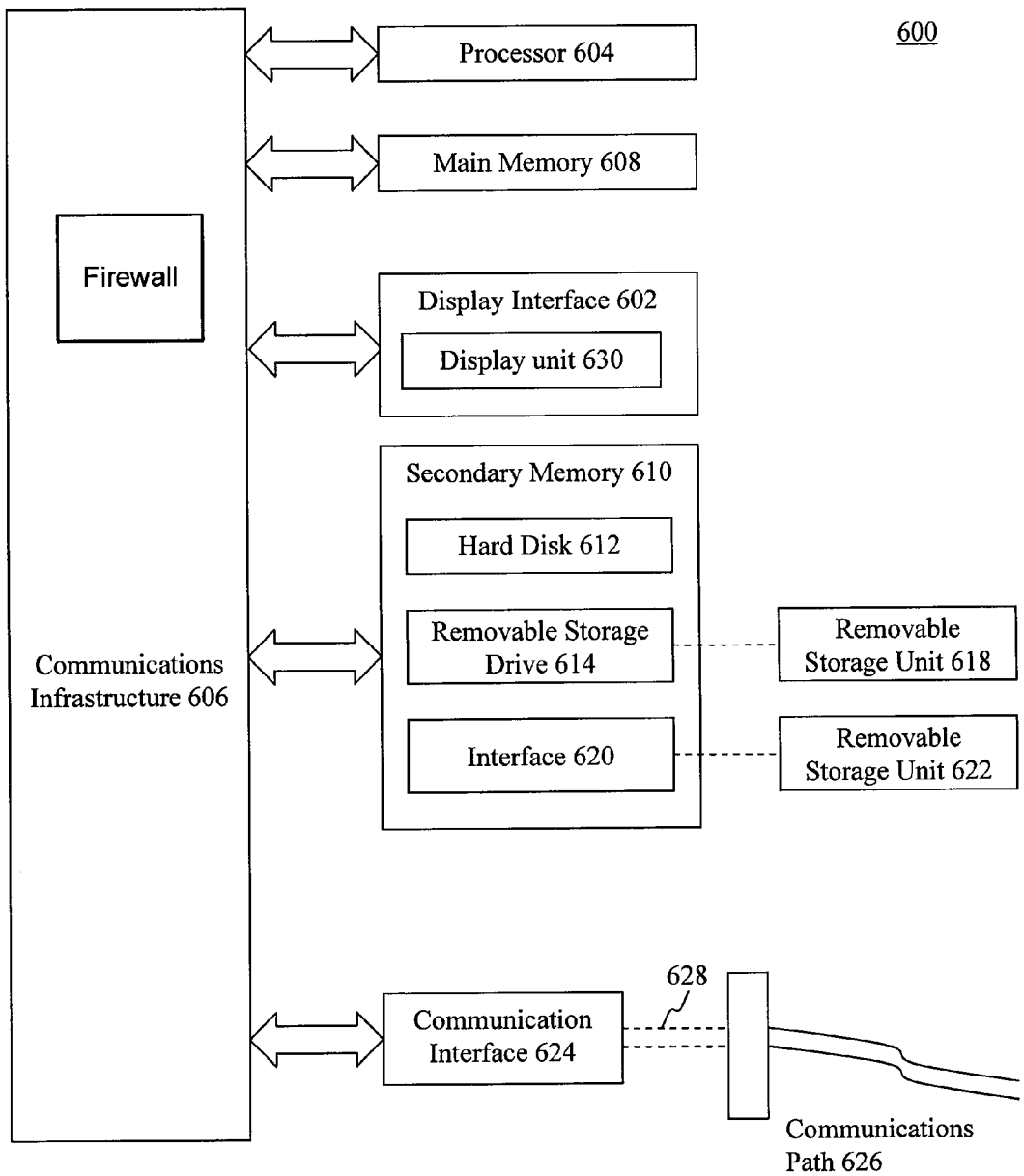
FIG. 6 is a block diagram of a sample computer system that can be used in the implementation of one or more embodiments of the present invention.

FIG. 6 is a block diagram of a sample computer system 600 that can be used in the implementation of one or more embodiments of the present invention. The present invention (i.e., systems and processes in FIGS. 1-5, or any part(s) or function(s) thereof) may be implemented using hardware, software or a combination thereof and may be implemented in one or more computer systems or other processing systems. However, the manipulations performed by the present invention were often referred to in terms, such as receiving or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices. In fact, in one embodiment, the invention is directed toward one or more computer systems capable of carrying out the functionality described herein.

The computer system 600 includes one or more processors, such as processor 604. The processor 604 is connected to a communication infrastructure 606 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

The computer-implemented method, and system for increasing a credit score and offer a transaction account to those that would otherwise be denied with no recourse includes a host server including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, etc.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Computer system 600 can include a display interface 602 that forwards graphics, text, and other data from the communication infrastructure 606 (or from a frame buffer not shown) for display on the display unit 630.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals which may be electronic, electromagnetic, optical or other signals capable of being received by communications interface 624. These signals are provided to communications interface 624 via a communications path (e.g., channel) 626. This channel 626 carries signals and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 614, a hard disk installed in hard disk drive 612, and signals. These computer program products provide software to computer system 600. The invention is directed to such computer program products.

Computer programs (also referred to as computer control logic) are stored in main memory 608 and/or secondary memory 610. Computer programs may also be received via communications interface 724. Such computer programs, when executed, enable the computer system 600 to perform the features of the present invention, as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

Conclusion

While various embodiments of the present invention have been described herein, it should be understood that they have been presented by way of example, and not limitation. It will be apparent to persons skilled in the relevant art(s) that various changes in form and detail can be made therein without departing from the spirit and scope of the present invention). Thus, the present invention should not be limited by any of the herein described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

In various embodiments, the methods described herein are implemented using the various particular machines described herein. The methods described herein may be implemented using the particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a non-transitory computer readable medium and/or memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; credit bureau data, third party data, financial institution data; and/or like data useful in the operation of the system. As those skilled in the art will appreciate, user computer may include an operating system (e.g., Windows NT, 95/98/2000, XP, Vista, OS2, UNIX, Linux, Solaris, MacOS, etc.) as well as various conventional support software and drivers typically associated with computers. A user may include any individual, business, entity, government organization, software and/or hardware that interact with a system. A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, and/or the like. Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

As used herein, the term "network" includes any electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, offline communications, wireless communications, transponder communications, local area network (LAN), wide area network (WAN), virtual private network (VPN), networked or linked devices, keyboard, mouse and/or any suitable communication or data input modality. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewalls may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface 132 which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, Visa Net® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more."

Moreover, where a phrase similar to "at least one of A, B, and C" or "at least one of A, B, or C" is used in the claims or the specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the invention has been described as a method, it is contemplated that it may be embodied as computer program instructions on a tangible computer-readable carrier, such as a magnetic or optical memory or a magnetic or optical disk. All structural, chemical, and functional equivalents to the elements of the herein-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
  receiving, by a computer based enrollment system, a request for a first transaction account;
  determining, by the computer based enrollment system, the request for a first transaction account fails to meet approval criteria for a first transaction account;

determining, by the computer based enrollment system, the request for a first transaction account meets approval criteria for a second transaction account;

counter-offering, by the computer based enrollment system, the request for the first transaction account with an offer for the second transaction account;

establishing, by the computer based enrollment system, an automatic payment program associated with the second transaction account; and associating, by the computer based enrollment system, a demand deposit account to the second transaction account, wherein removing restrictions on the second transaction account results in the second transaction account being indistinguishable from the first transaction account.

2. The method of claim 1, further comprising relaxing restrictions on the second transaction account based upon at least one of:
receiving payment of a pre-selected amount,
receiving payments over a pre-selected period, and
receiving payment before a pre-selected date.

3. The method of claim 2, wherein relaxing restrictions includes at least one of increasing the spend limit threshold on the second transaction account, removal of the demand deposit account link to the second transaction account and suspension of the automatic payment program.

4. The method of claim 1, further comprising placing a spend limit threshold on the second transaction account.

5. The method of claim 1, further comprising awarding an incentive to enrollees of the second transaction account.

6. The method of claim 1, further comprising associating an overdraft account to the second transaction account.

7. The method of claim 1, wherein the determining the request for the first transaction account meets decline criteria is based upon a credit check of the applicant.

8. The method of claim 1, wherein the determining the request for the first transaction account meets decline criteria is based upon a stored applicant information.

9. The method of claim 1, wherein a payment of a pre-selected amount to the second transaction account, over a pre-selected period and before a pre-selected date, increases a transaction account holder credit score.

10. The method of claim 1, wherein canceling the automatic payment program results in at least temporary revocation of further second transaction account privileges.

11. The method of claim 1, wherein insufficient funds in the demand deposit account to pay a pre-selected portion of the second transaction account balance results in at least temporary revocation of further second transaction account privileges.

12. The method of claim 1, further comprising performing a fraud check in association with a request for the first transaction account.

13. The method of claim 12, wherein determining the request for the first transaction account meets decline criteria is based upon the outcome of the fraud check.

14. The method of claim 1, further comprising associating :loyalty rewards with purchases completed with the second transaction account.

15. The method of claim 1, wherein the demand deposit account is one of a savings account, a checking account, asset managed investment, accounts and retirement account.

16. The method of claim 1, wherein a physical card associated with the second transaction account is physically indistinguishable from a physical card associated with the first transaction account.

17. A method comprising:
receiving, by a computer based enrollment system, a request for a first transaction account;
determining, by the computer based enrollment system, the request for a first transaction account fails to meet approval criteria for a first transaction account;
determining, by the computer based enrollment system, the request for a first transaction account meets approval criteria for a second transaction account;
counter-offering, by the computer based enrollment system, the request for the first transaction account with an offer for the second transaction account;
establishing, by the computer based enrollment system, an automatic payment program associated with the second transaction account; and
associating, by the computer based enrollment system, a demand deposit account to the second transaction account, wherein a spend limit threshold is placed on the second transaction account.

18. A method comprising:
receiving, by a computer based enrollment system, a request for a first transaction account;
determining, by the computer based enrollment system, the request for a first transaction account fails to meet approval criteria for a first transaction account;
determining, by the computer based enrollment system, the request for a first transaction account meets approval criteria for a second transaction account;
counter-offering, by the computer based enrollment system, the request for the first transaction account with an offer for the second transaction account;
establishing, by the computer based enrollment system, an automatic payment program associated with the second transaction account;
associating, by the computer based enrollment system, a demand deposit account to the second transaction account; and
awarding, by the computer based enrollment system, an incentive to enrollees of the second transaction account.

19. A method comprising:
receiving, by a computer based enrollment system, a request for a first transaction account;
determining, by the computer based enrollment system, the request for a first transaction account fails to meet approval criteria for a first transaction account;
determining, by the computer based enrollment system, the request for a first transaction account meets approval criteria for a second transaction account;
counter-offering, by the computer based enrollment system, the request for the first transaction account with an offer for the second transaction account;
establishing, by the computer based enrollment system, an automatic payment program associated with the second transaction account;
associating, by the computer based enrollment system, a demand deposit account to the second transaction account; and
associating, by the computer based enrollment system, an overdraft account to the second transaction account.

* * * * *